United States Patent
Daw Perez et al.

(10) Patent No.: US 12,330,809 B2
(45) Date of Patent: Jun. 17, 2025

(54) MULTI-ROBOTS SYSTEM FOR CARGO HANDLING

(71) Applicant: GOODRICH CORPORATION, Charlotte, NC (US)

(72) Inventors: Zamira A. Daw Perez, Albany, CA (US); Alessandro Pinto, Kensington, CA (US); Richa Varma, El Cerrito, CA (US); Xiaobin Zhang, Morgan Hill, CA (US); Binu M. Nair, San Mateo, CA (US)

(73) Assignee: GOODRICH CORPORATION, Charlotte, NC (US)

( * ) Notice: Subject to any disclaimer, the term of this patent is extended or adjusted under 35 U.S.C. 154(b) by 895 days.

(21) Appl. No.: 16/166,657

(22) Filed: Oct. 22, 2018

(65) Prior Publication Data

US 2020/0122834 A1 Apr. 23, 2020

(51) Int. Cl.
*B64D 9/00* (2006.01)
*B60P 7/13* (2006.01)
*G05D 1/00* (2006.01)
*H04W 4/02* (2018.01)
*H04W 4/029* (2018.01)
*H04W 4/70* (2018.01)

(52) U.S. Cl.
CPC ............... *B64D 9/003* (2013.01); *B60P 7/13* (2013.01); *G05D 1/0212* (2013.01); *H04W 4/025* (2013.01); *H04W 4/029* (2018.02); *H04W 4/70* (2018.02); *B60Y 2200/62* (2013.01); *B64D 2009/006* (2013.01)

(58) Field of Classification Search
CPC .................................. B64D 9/003; H04W 4/70
USPC ........................ 414/459, 460, 809; 254/89 R
See application file for complete search history.

(56) References Cited

U.S. PATENT DOCUMENTS

| | | | | |
|---|---|---|---|---|
| 4,768,914 A | * | 9/1988 | Sing | B65G 1/0478 198/300 |
| 4,887,016 A | * | 12/1989 | Malick | B25J 9/1692 700/254 |
| 6,315,079 B1 | * | 11/2001 | Berends | B66F 3/46 187/203 |
| 9,823,659 B2 | | 11/2017 | Holmberg et al. | |
| 10,059,450 B2 | * | 8/2018 | Levron | B64D 9/00 |
| 2015/0232309 A1 | * | 8/2015 | Jaipaul | B66F 7/04 414/800 |
| 2017/0057081 A1 | | 3/2017 | Krohne et al. | |
| 2018/0018519 A1 | * | 1/2018 | O'Brien | G06F 40/117 |
| 2018/0029707 A1 | | 2/2018 | Levron | |

FOREIGN PATENT DOCUMENTS

WO        2017072771        5/2017

* cited by examiner

*Primary Examiner* — Mark C Hageman
*Assistant Examiner* — Willie W Berry, Jr.
(74) *Attorney, Agent, or Firm* — SNELL & WILMER L.L.P.

(57) ABSTRACT

The present disclosure provides a cargo handling system. The cargo handling system comprises a first cargo handling robot and a second cargo handling robot, wherein the first cargo handling robot and the second cargo handling robot are configured to transport a cargo unit from a first position to a second position, the first cargo handling robot and the second cargo handling robot configured to move in two dimensions about a cargo deck.

18 Claims, 7 Drawing Sheets

MULTI-ROBOTS SYSTEM FOR CARGO HANDLING

FIELD OF THE DISCLOSURE

The present disclosure relates to cargo handling systems, and more particularly, to aircraft cargo handling systems.

BACKGROUND OF THE DISCLOSURE

Aircraft cargo handling systems conventionally include a series of power drive units ("PDUs") embedded in the cargo deck and configured to relocate cargo within the cargo bay of the aircraft. Typically, these PDUs are limited in their ability to move the cargo in more than one dimension and can represent additional weight for the aircraft, which includes components to operate the PDUs such as control boards and power cables.

SUMMARY OF THE DISCLOSURE

A cargo handling system may comprise a first cargo handling robot, and a second cargo handling robot, wherein the first cargo handling robot and the second cargo handling robot are configured to transport a cargo unit from a first position to a second position, the first cargo handling robot and the second cargo handling robot configured to move in two dimensions about a cargo deck.

In various embodiments, the first cargo handling robot comprises an attachment mechanism and a movement mechanism and the second cargo handling robot comprises an attachment mechanism and a movement mechanism. The first cargo handling robot and the second cargo handling robot may be configured to attach to the cargo unit via the attachment mechanisms. The attachment mechanism may comprise one of an electrically, pneumatically, or hydraulically powered clamp, piston, screw. The attachment mechanism may comprise one of an active attachment mechanism or passive attachment mechanism. The cargo deck may comprise one of a metallic material or a composite material and comprises a plurality of conveyance rollers. The first cargo handling robot and second cargo handling robot may communicate via a network. The cargo handling system may further comprise a control module in communication with the network and configured to provide instructions to the first cargo handling robot and the second cargo handling robot. The first cargo handling robot and the second cargo handling robot may comprise a sensing agent comprising a sensing module, a computing module, and a communication module. The first cargo handling robot and the second cargo handling robot may be capable of functioning autonomously.

A cargo handling robot may comprise an attachment mechanism, and a movement mechanism, wherein the attachment mechanism is configured to couple to a cargo unit and the movement mechanism is configured to transport the cargo unit from a first position to a second position along two dimensions.

The movement mechanism and attachment mechanisms may be powered by an internal battery or by an external power source. The cargo handling robot may be configured to communicate with a second cargo handling robot to move the cargo unit. The movement mechanism may comprise a motor coupled to a gear box configured to drive a set of high friction coefficient wheels. The cargo handling robot may further comprise a sensing agent comprising a sensing module, a computing module, and a communication module. The sensing module may comprise one of a camera, a structured light sensor, a light detection and ranging sensor, an infrared sensor, a depth sensor, a 3D scanner, an ultrasound range finder, or a radar sensor.

A method of moving a cargo unit via multiple cargo handling robots may comprise transmitting, via a network, a first position to a first cargo handling robot and a second cargo handling robot, moving the first cargo handling robot and the second cargo handling robot to the first position, attaching the first cargo handling robot and the second cargo handling robot to the cargo unit at the first position, transmitting, via the network, a second position to the first cargo handling robot and the second cargo handling robot, and moving, via the first cargo handling robot and the second cargo handling robot, the cargo unit to the second position.

In various embodiments, attaching the first cargo handling robot and the second cargo handling robot to the cargo unit comprises utilizing attachment mechanisms of the first cargo handling robot and the second cargo handling robot, the attachment mechanisms comprising one of an active attachment mechanism or a passive attachment mechanism. Moving the cargo unit to the second position may comprise moving the cargo unit in two dimensions. The network may be in communication with a control module configured to provide instructions to the first cargo handling robot and the second cargo handling robot.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

The accompanying drawings are included to provide a further understanding of the present disclosure and are incorporated in, and constitute a part of, this specification, illustrate various embodiments, and together with the description, serve to explain the principles of the disclosure.

DETAILED DESCRIPTION

The detailed description of various embodiments herein makes reference to the accompanying drawings, which show various embodiments by way of illustration. While these various embodiments are described in sufficient detail to enable those skilled in the art to practice the disclosure, it should be understood that other embodiments may be realized and that logical, chemical, electrical, and mechanical changes may be made without departing from the spirit and scope of the disclosure. Thus, the detailed description herein is presented for purposes of illustration only and not of limitation.

For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected, or the like may include permanent, removable, temporary, partial, full, and/or any other possible attachment option. Additionally, any reference to without contact (or similar phrases) may also include reduced contact or minimal contact.

For example, in the context of the present disclosure, methods, systems, and articles may find particular use in connection with cargo handling systems. However, various aspects of the disclosed embodiments may be adapted for performance in a variety of other systems. As such, numerous applications of the present disclosure may be realized.

As used herein, "aft" refers to the direction associated with the tail of an aircraft, or generally, to the direction of exhaust of the gas turbine. As used herein, "forward" refers to the direction associated with the nose of an aircraft, or generally, to the direction of flight or motion.

Aircraft cargo handling systems as disclosed herein allow cargo units to be loaded onto an aircraft and positioned within the aircraft without the need for an active cargo deck comprising one or more PDUs. In that regard, aircraft cargo handling systems as disclosed herein may result in increased flexibility of movement of cargo units, reduce human operator involvement, reduce part count and associated replacement/wear costs over time, and/or reduce weight of the aircraft.

Figure 1A:
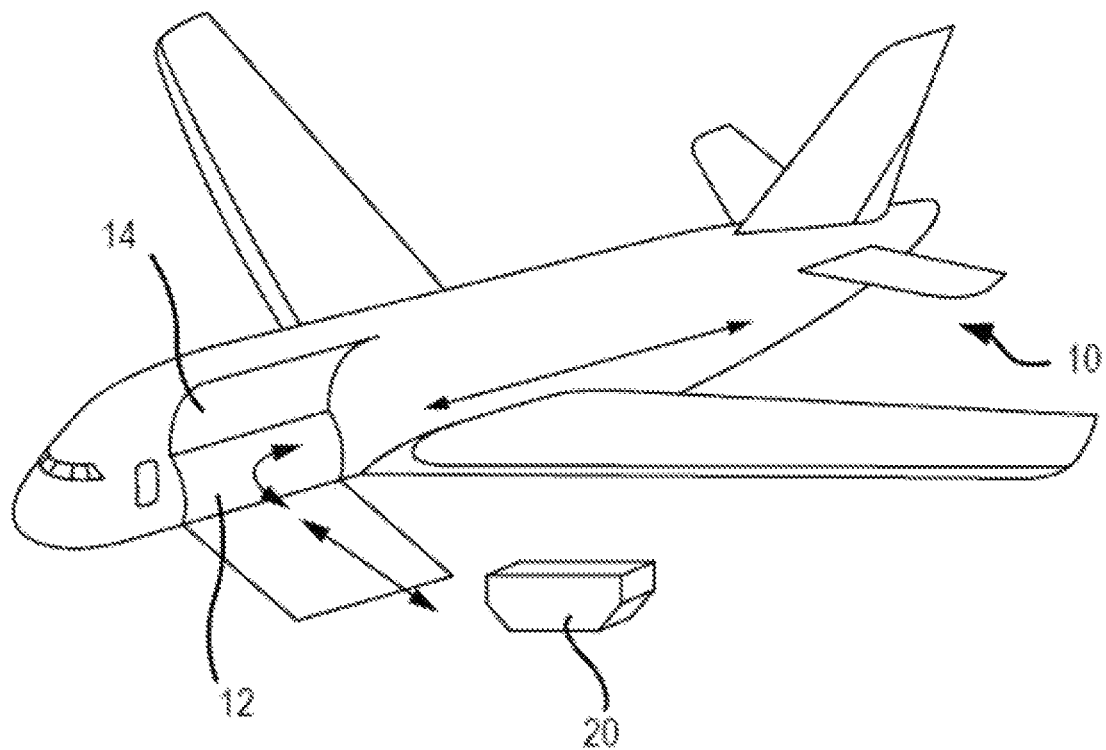
FIG. 1A illustrates a schematic view of an aircraft being loaded with a cargo unit, in accordance with various embodiments.

In various embodiments, and with reference to FIG. 1A, a schematic view of an aircraft 10 having a cargo deck 12 is illustrated. Aircraft 10 may comprise a cargo load door 14, for example, at a side of the fuselage structure of aircraft 10, at an aft end of the fuselage structure, and/or at any other suitable location. Cargo unit 20 may be loaded through cargo load door 14 and onto cargo deck 12 of aircraft 10 or unloaded from cargo deck 12 of aircraft 10. Although cargo unit 20 is illustrated as a cargo container, cargo unit 20 could also be a pallet, an irregularly shaped object, an irregularly shaped container, or other cargo.

Items to be shipped by air, freight, and/or the like are typically loaded first onto specially configured pallets or into specially configured containers, also known as unit load devices or "ULDs." In that regard, as referred to herein, cargo unit 20 may also refer to a ULD. ULDs are available in various sizes and capacities, and are typically standardized in dimension and shape. Once loaded with cargo items, the ULD is transferred to aircraft 10, and is loaded onto aircraft 10 through cargo load door 14 using a conveyor ramp, scissor lift, or the like. Once inside aircraft 10, the ULD is moved within cargo deck 12 to its final stowage position, as discussed further herein. Multiple ULDs may be brought on-board aircraft 10, during one or more loading procedures (e.g., at separate destinations), with each ULD being placed in its respective stowage and transportation position in cargo deck 12. After aircraft 10 has reached its destination, one or more ULDs may be unloaded from aircraft 10 similarly, but in reverse sequence to the loading procedure. The loading and/or unloading sequence could be fixed prior to the start of operations or could be computed/re-computed during operations to handle contingencies with the loading and/or unloading sequence.

Figure 1B:
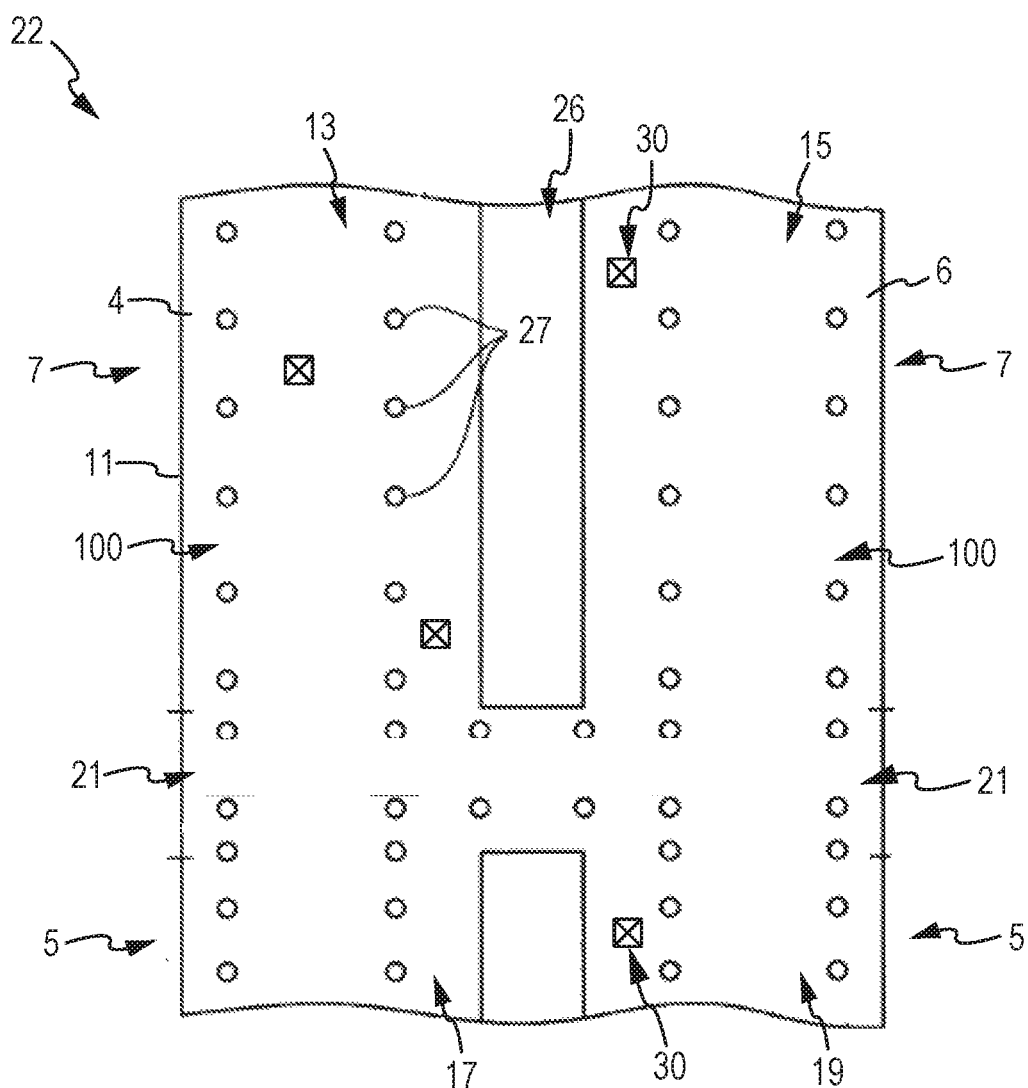
FIG. 1B illustrates a top view of a cargo deck for the aircraft of FIG. 1A, in accordance with various embodiments.
Figure 1B:
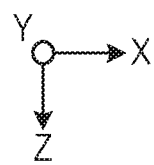

In various embodiments, and with reference to FIG. 1B and continued reference to FIG. 1A, cargo deck 22 is illustrated in greater detail. A generally H-shaped conveyance surface 26 may form cargo deck 22, adjacent to cargo load door 14. However, there are many other aircraft cargo deck configurations to which the embodiments of the disclosure can be implemented. For example, various aircraft, particularly those designed primarily for the transportation of cargo without passengers, may have the upper passenger deck removed and an additional larger cargo deck installed. Other aircraft may have three or more parallel longitudinal tracks rather than the H-shape depicted in FIG. 1B.

The cargo compartment may be defined by an inner wall of aircraft 10 (e.g., an aircraft envelope 11), and may include a cargo loading system comprising a plurality of freely rotating conveyance rollers 27 mounted in cargo deck 22 to define a conveyance plane. Cargo unit 20 loaded onto cargo deck 22 can be moved manually throughout the cargo bay upon conveyance rollers 27. However, it may be desirable to electromechanically propel cargo unit 20 with minimal or no manual assistance.

In the longitudinal direction, conveyance surface 26 may include a left track 4 and a right track 6 along which cargo unit 20 is to be stowed in parallel columns during flight. In the transverse direction, cargo deck 22 may also be logically separated into a tail (or "aft") section 5 and a forward section 7. Thus, the left and right tracks 4, 6 may be divided into four sections, two forward sections (e.g., a left forward section 13 and a right forward section 15) and two aft sections (e.g., a left aft section 17 and a right aft section 19). In addition to the four sections, there may be an additional path 21 between both tracks 4, 6 proximate cargo load door 14. This additional path 21 divides the cargo bay between forward section 7 and aft section 5. Additional path 21 is used to move cargo unit 20 into and out the aircraft 10, and also to transfer cargo unit 20 between the left track 4 and right track 6.

In various embodiments, multiple cargo handling robots 30 may be distributed throughout cargo deck 22. Cargo handling robots 30 may be configured to replace PDUs embedded in cargo deck 22. Cargo handling robots 30 may be configured to move freely throughout cargo deck 22, attach to one or more cargo units 20, and transport cargo unit 20 to different areas throughout cargo deck 22. For example, in various embodiments, cargo handling robots 30 may work together to move cargo unit 20 over conveyance rollers 27 along two dimensions on cargo deck 22 such that cargo unit 20 can be secured for flight or otherwise stored in aircraft 10. In such a way, cargo handling robots 20 may continually assist in the movement of cargo units 20, removing the need for human operators. Further, cargo handling robots may reduce the weight of aircraft 10 when compared with traditional cargo handling systems utilizing one or more PDUs.

Figure 2A:
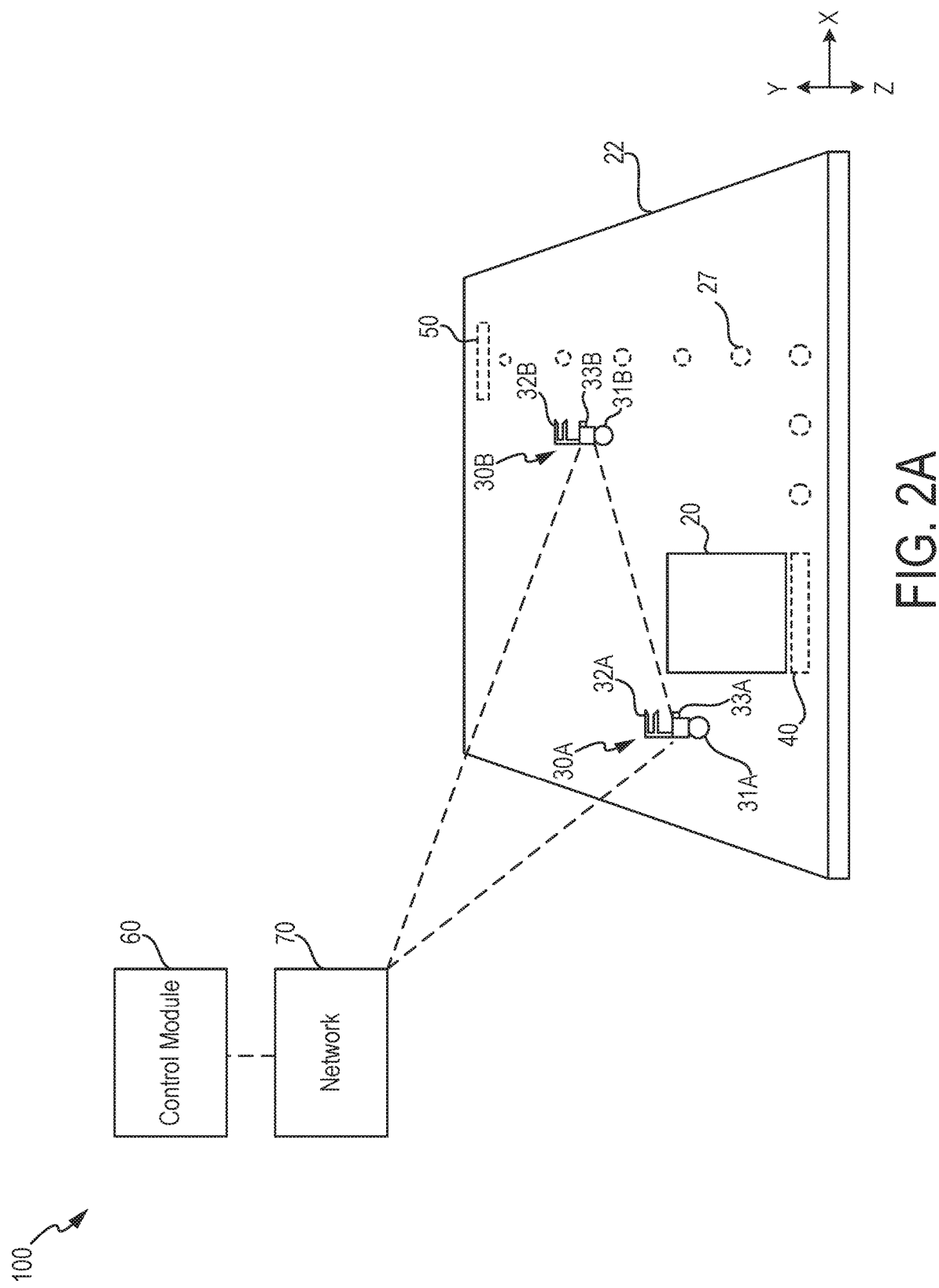
FIGS. 2A, 2B, and 2C illustrate top perspectives views of a cargo handling system, in accordance with various embodiments.
Figure 2B:
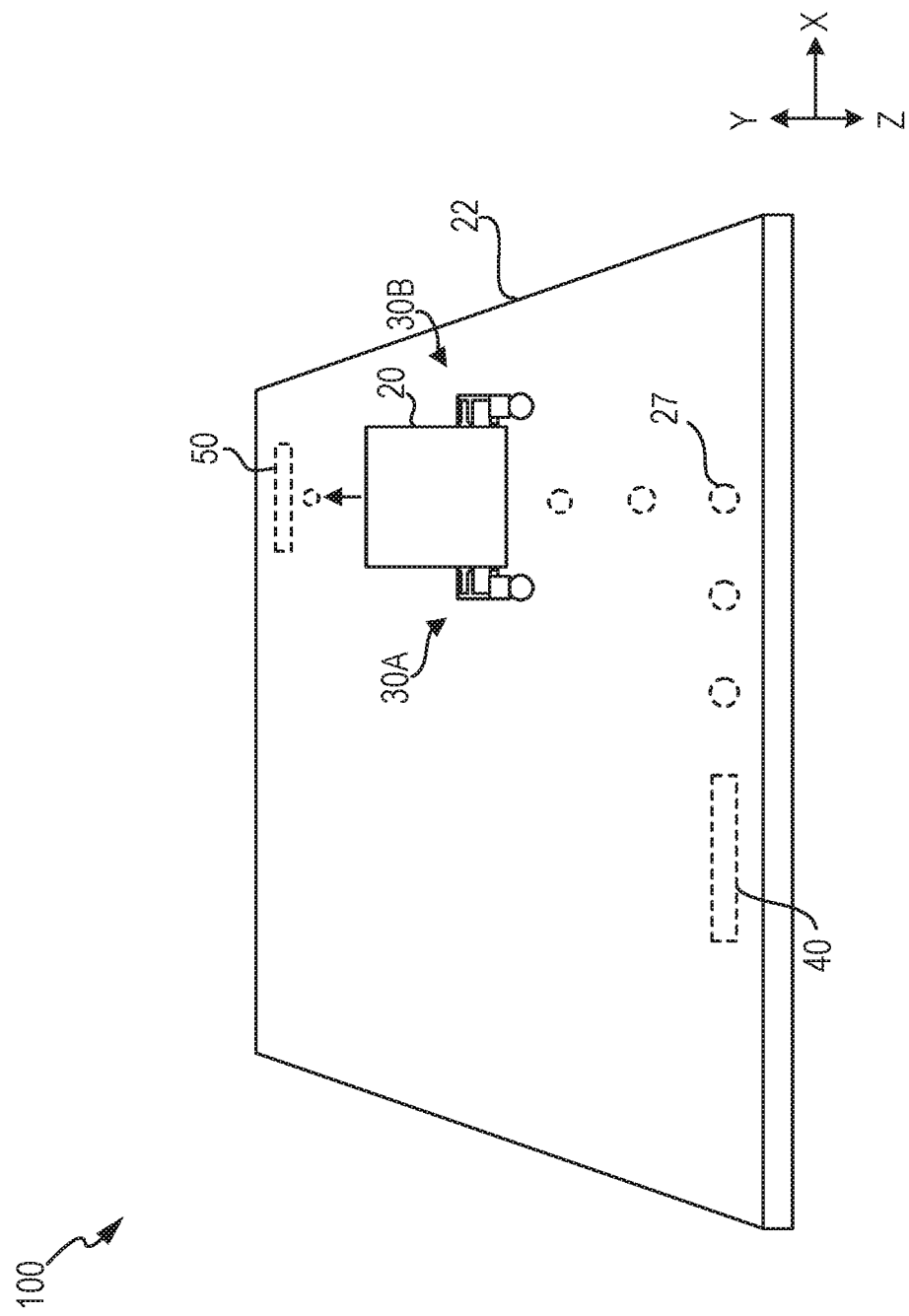
Figure 2C:
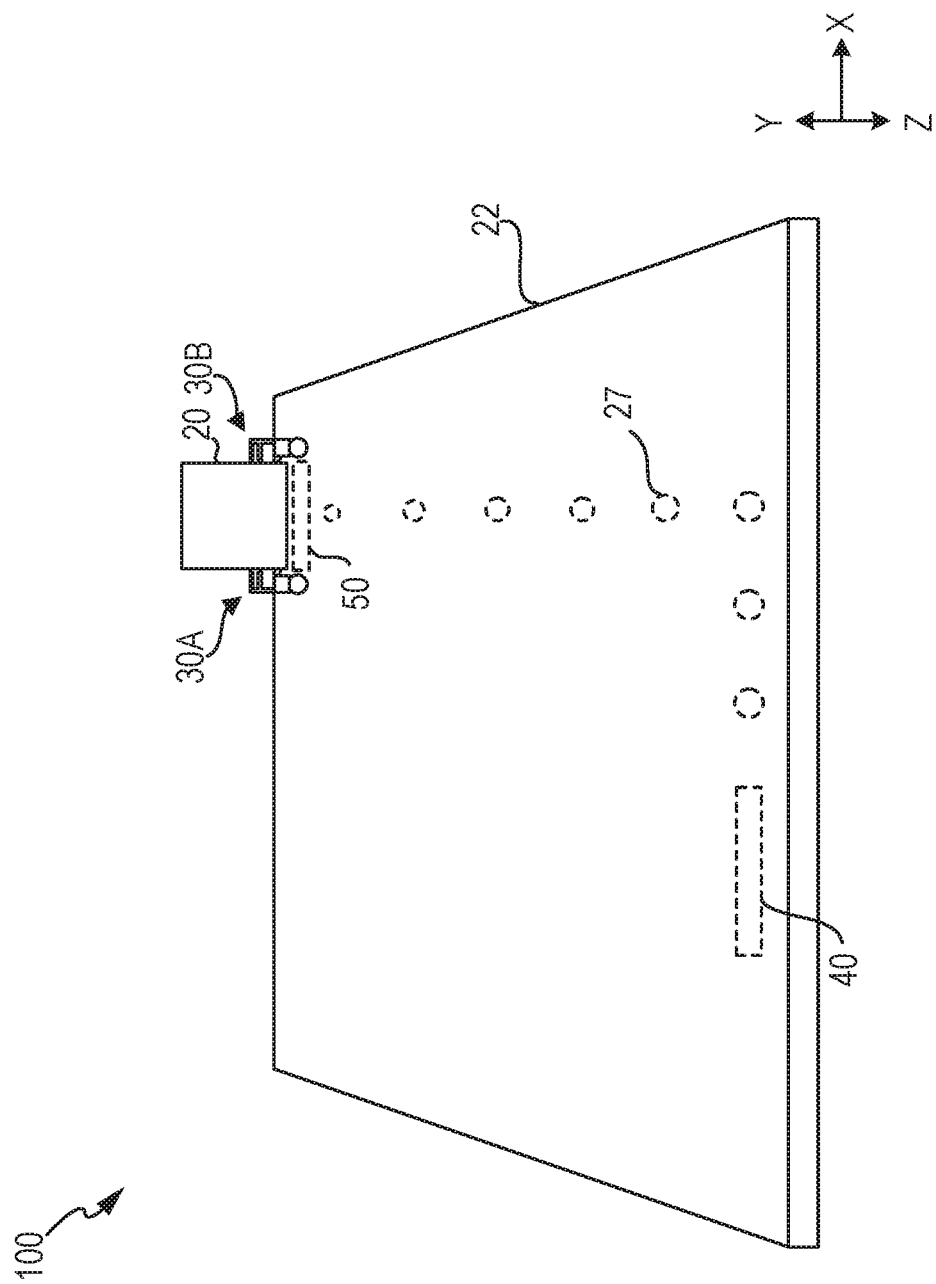

Referring now to FIGS. 2A-2C, a cargo handling system 100 is illustrated from a top perspective view, in accordance with various embodiments. Cargo handling system 100 may comprise a cargo deck 22 similar to that illustrated in FIG. 1B. Cargo deck 22, which may comprise a plurality of conveyance rollers 27, may comprise one of a composite or a metallic material which may be friction resistant, such as via an applied coating such that cargo unit 20 may easily move over conveyance rollers 27. Cargo unit 20 may begin in a first position 40 and be configured to be moved to a second position 50 by a first cargo handling robot 30A and a second cargo handling robot 30B. First position 40 may be proximate to a cargo load door of an aircraft (for example, cargo load door 14 of FIG. 1A), for example, while second position 50 may be a proximate a final stowage position wherein cargo unit 20 may be secured for a duration of a flight. However, first position 40 and second position 50 are not limited in this regard and may refer to any two positions on cargo deck 22.

More specifically, in various embodiments, first cargo handling robot 30A and second cargo handling robot 30B may move cargo unit 20 from first position 40 to second position 50, where cargo unit 20 may be secured by a human operator and remain for the duration of a flight. Once the aircraft lands, the process can be reversed such that cargo is moved by first cargo handling robot 30A and second cargo handling robot 30B back to first position 40 or elsewhere on cargo deck 22. In such a way, first cargo handling robot 30A and second cargo handling robot 30B may replace PDUs or other electromechanical actuators traditionally embedded in the cargo decks. In various embodiments, first cargo handling robot 30A may comprise a movement mechanism 31A, an attachment mechanism 32A, and a sensing agent 33A. Likewise, second cargo handling robot 30B may comprise a movement mechanism 31B, an attachment mechanism 32B, and a sensing agent 33B.

Movement mechanisms 31A and 31B may be configured to move first cargo handling robot 30A and second cargo handling robot 30B, respectively, about cargo deck 22. Movement mechanisms 32A and 32B may be configured to move first cargo handling robot 30A and second cargo handling robot 30B in a first direction (for example, in the X-direction) and a second direction (for example, in the Z-direction) and rotate first cargo handling robot 30A and second cargo handling robot 30B about the y-axis in a clockwise or counterclockwise direction. As such, in various embodiments, movement mechanisms 31A and 31B may comprise any system capable of allowing translational movement along two dimensions. For example, in various embodiments, movement mechanisms 31A and 31B may comprise a motor coupled to a gear box configured to drive a set of high friction coefficient wheels. Movement mechanisms may be powered by a variety sources. In various embodiments, movement mechanisms may be powered by an internal rechargeable battery situated within first cargo handling robot 30A and/or second cargo handling robot 30B or be powered by an external power sources by way of power cables or through contact with cargo deck 22 or aircraft envelope 11. Thus, in various embodiments, first cargo handling robot 30A and second cargo handling robot 30B may be configured to move cargo unit 20 to any suitable position on cargo deck 22 over conveyance rollers 27.

In various embodiments, attachment mechanisms 32A and 32B may comprise "active" mechanisms or "passive" mechanisms. For example, in various embodiments, attachment mechanisms 32A and 32B may comprise any type of actuator suitable for attaching to and detaching from cargo unit 20 or otherwise maneuvering cargo unit 20 such as an electrically, pneumatically, or hydraulically powered clamp, piston, screw, or the like. For example, attachment mechanisms 32A and 32B comprising active mechanisms may screw onto, clamp down on, push, pull, or otherwise couple and/or maneuver cargo unit 20 such that cargo unit 20 can be moved over conveyance rollers 27 and moved throughout cargo deck 22. Attachment mechanism 32A and 32B may comprise robotic arm(s) having multiple degrees of movement. In various embodiments, attachment mechanisms 32A and 32B may comprise passive mechanisms such as hooks, clamps, or other mechanisms capable of coupling to or otherwise maneuvering cargo unit 20 without the need for a separate power source to attachment mechanisms 32A and 32B. First cargo handling robot 30A and second cargo handling robot 30B may be configured to attach to and detach from any portion of cargo unit 20. For example, attachment mechanisms 32A and 32B may couple to any side, a bottom, or a top of cargo unit 20 before moving cargo along cargo deck 22. In various embodiments, first cargo handling robot 30A and second cargo handling robot 30B may attach to different or the same portions of cargo unit 20.

In various embodiments, first cargo handling robot 30A and second cargo handling robot 30B may be provided instructions from a control module 60. Control module 60 may be located onboard the first cargo handling robot 30A and the second cargo handling robot 30B or another location. First cargo handling robot 30A and second cargo handling robot 30B may be in communication with each other via a network 70, which may assist first cargo handling robot 30A and second cargo handling robot 30B in coordinating movement of cargo unit 20 throughout cargo deck 22. Network 70 may carry signals and may be implemented using wire, cable, fiber optics, a telephone line, a cellular link, a radio frequency (RF) link, wireless, and/or other communications channels. Network 70 may be in communication with control module 60 and be configured to communicate instructions to first cargo handling robot 30A and second cargo handling robot 30B. The various system components may be independently, separately or collectively suitably coupled to the network via data links which includes, for example, a connection to an Internet Service Provider (ISP) over the local loop as is typically used in connection with standard modem communication, cable modem, Dish Networks®, ISDN, Digital Subscriber Line (DSL), or various wireless communication methods, see, e.g., GILBERT HELD, UNDERSTANDING DATA COMMUNICATIONS (1996), which is hereby incorporated by reference. It is noted that the network may be implemented as other types of networks, such as an interactive television (ITV) network. Moreover, the system contemplates the use, sale or distribution of any goods, services or information over any network having similar functionality described herein.

For example, with reference to FIG. 2A, first cargo handling robot 30A and second cargo handling robot 30B may be positioned randomly on cargo deck 22 at a time T0. With reference to FIG. 2B, control module 60 may instruct first cargo handling robot 30A and second cargo handling robot 30B to move to a location of cargo unit 20 wherein first cargo handling robot 30A and second cargo handling robot 30B may attach to cargo unit 20 via attachment mechanisms 32A and 32B. First cargo handling robot 30A and second cargo handling robot 30B may then begin moving cargo unit 20 (in various embodiments, along two dimensions) via movement mechanisms 31A and 32B at a time T1. With reference to FIG. 2C, at a time T2, cargo unit 20 may arrive at second position 50 and first cargo handling robot 30A and second cargo handling robot 30B may detach from cargo unit 20. The process may then be repeated using first cargo handling robot 30A and second cargo handling robot 30B and/or other cargo handling robots to move the same or other cargo units to any position on cargo deck 22.

Control module 60 may access one or more databases corresponding to cargo handling robot positioning, initial cargo unit positioning, desired cargo unit positioning, cargo unit size and/or shape, mapping information associated with cargo deck 22, routing information, and/or other information relating to first cargo handling robot 30A, second cargo handling robot 30B, and/or cargo unit 20 and instruct first cargo handling robot 30A and second cargo handling robot 30B to function accordingly.

Figure 3:
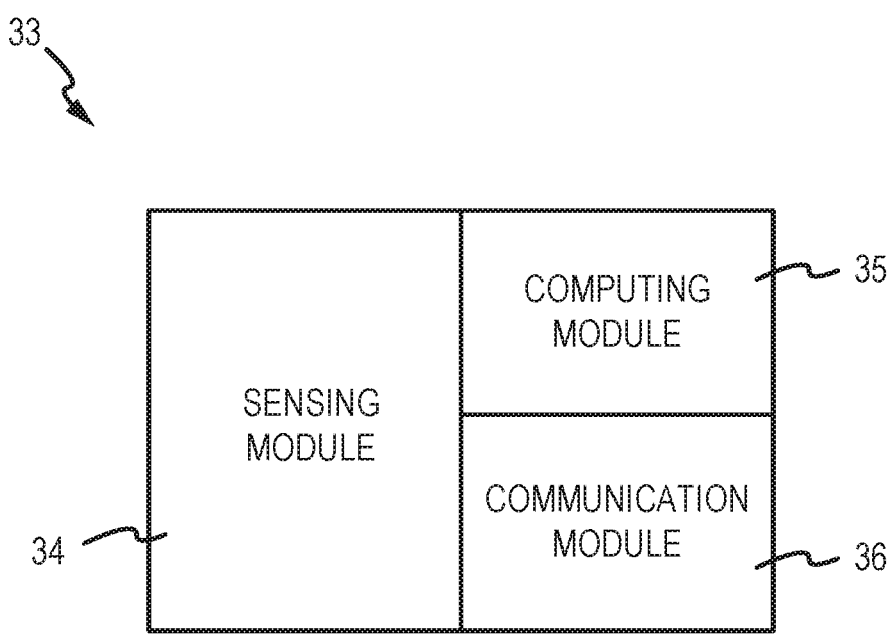
FIG. 3 illustrates a block diagram of an exemplary sensing agent, in accordance with various embodiment.

In various embodiments, first cargo handling robot 30A and second cargo handling robot 30B may utilize situational awareness to gather information not communicated through control module 60. For example, with reference to FIG. 3, first cargo handling robot 30A and second cargo handling robot 30B of cargo handling system 100 may comprise one or more sensing agents 33A, 33B (e.g., a first sensing agent, a second sensing agent, an Nth sensing agent, etc.). Each sensing agent 33 may be configured to monitor and gather data during the cargo loading process. Sensing agents 33 may be located in first cargo handling robot 30A and second cargo handling robot 30B. Cargo handling robots comprising sensing agents 33 may be dispersed throughout cargo deck 22 to at least partially ensure monitoring coverage throughout cargo deck 22, as discussed further herein (e.g., to create a distributed network of sensing agents 33).

In various embodiments, each sensing agent 33 may comprise any suitable apparatus capable of monitoring and gathering data during the cargo loading process. Each sensing agent 33 may also be computer based, and may comprise a processor, a tangible non-transitory computer-readable memory, and/or a network interface, along with other suitable system software and hardware components. Instructions stored on the tangible non-transitory memory may allow each sensing agent 33 to perform various functions, as described herein.

System program instructions and/or processor instructions may be loaded onto a tangible, non-transitory, computer-readable medium (also referred to herein as a tangible, non-transitory, memory) having instructions stored thereon that, in response to execution by a controller, may cause the processor to perform various operations. The term "non-transitory" is to be understood to remove only propagating transitory signals per se from the claim scope and does not relinquish rights to all standard computer-readable media that are not only propagating transitory signals per se. Stated another way, the meaning of the term "non-transitory computer-readable medium" and "non-transitory computer-readable storage medium" should be construed to exclude only those types of transitory computer-readable media which were found in In re Nuijten to fall outside the scope of patentable subject matter under 35 U.S.C. § 101.

In various embodiments, each sensing agent 33 may also comprise various sub-components to aid in monitoring and gathering data in cargo deck 22. For example, each sensing agent 33 may comprise a sensing module 34, a computing module 35, and/or a communication module 36. Sensing module 34, computing module 35, and/or communication module 36 may be in operative and/or electronic communication with each other. Computing module 35 may include logic configured to control sensing module 34 and/or communication module 36. In various embodiments, sensing module 34 may comprise any suitable apparatus, hardware, and/or software capable of monitoring a portion of cargo deck 22. Each sensing agent 33 may comprise one or more sensing modules 34. For example, sensing module 34 may comprise at least one of a camera, a structured light sensor, a light detection and ranging (LiDAR) sensor, an infrared sensor, a depth sensor (e.g., an IR projector/camera assembly such as a MICROSOFT® Kinect®, an ASUS® Xtion PRO®, etc.), a 3D scanner/camera, an ultrasound range finder, a radar sensor, and/or any other suitable sensing device. Each sensing module 34 may also comprise sensors to sense a weight of an object (a "weight sensor") such as, for example, a pressure sensor, a piezo-electric sensor, and/or the like. Accordingly, first cargo handling robot 30A and second cargo handling robot 30B may be configured to adjust autonomously in real time to any variables not anticipated by control module 60 such as the presence of foreign objects on cargo deck 22, nonconforming cargo units, and/or adjustments to the first and/or second position.

Figure 4:
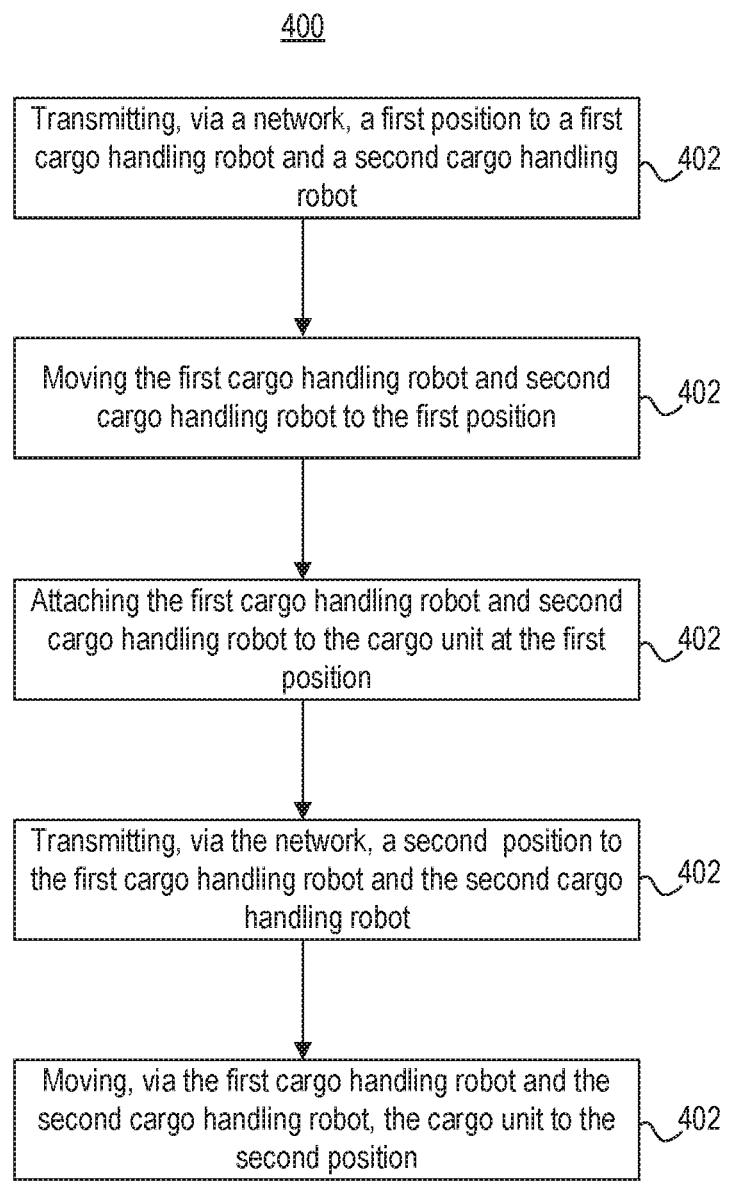
FIG. 4 illustrates a method of handling a cargo unit via multiple cargo handling robots, in accordance with various embodiments.

A block diagram illustrating a method of moving a cargo unit via multiple cargo handling robots is illustrated in FIG. 4, in accordance with various embodiments. The method may comprise transmitting, via a network, a first position to a first cargo handling robot and a second cargo handling robot (step 402). The method may comprise moving the first cargo handling robot and second cargo handling robot to the first position (step 404). The method may comprise attaching the first cargo handling robot and second cargo handling robot to the cargo unit at the first position (step 406). The method may comprise transmitting, via the network, a second position to the first cargo handling robot and the second cargo handling robot (step 408). The method may comprise moving, via the first cargo handling robot and the second cargo handling robot, the cargo unit to the second position (step 410).

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Methods, systems, and computer-readable media are provided herein. In the detailed description herein, references to "one embodiment", "an embodiment", "various embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. An aircraft cargo handling system, comprising:
a first cargo handling robot; and
a second cargo handling robot, wherein the first cargo handling robot and the second cargo handling robot are configured to simultaneously couple to a common cargo unit to transport the cargo unit from a first position on a cargo deck to a different second position on the cargo deck, the first cargo handling robot and the second cargo handling robot configured to move in two different dimensions about the cargo deck in response to receiving instructions from a control module to move the cargo unit from the first position to the second position;
wherein the first cargo handling robot and the second cargo handling robot comprise a sensing agent comprising a sensing module, a computing module, and a communication module; and
the first cargo handling robot and the second cargo handling robot are capable of functioning autonomously.

2. The aircraft cargo handling system of claim 1, wherein the first cargo handling robot comprises an attachment mechanism and a movement mechanism and the second cargo handling robot comprises an attachment mechanism and a movement mechanism.

3. The aircraft cargo handling system of claim 2, wherein the first cargo handling robot and the second cargo handling robot are configured to attach to the cargo unit via the attachment mechanisms.

4. The aircraft cargo handling system of claim 2, wherein the attachment mechanism comprises one of an electrically, pneumatically, or hydraulically powered clamp, piston, or screw.

5. The aircraft cargo handling system of claim 2, wherein the attachment mechanisms comprise one of an active attachment mechanism or a passive attachment mechanism.

6. The aircraft cargo handling system of claim 1, wherein the cargo deck comprises one of a metallic material or a composite material and comprises a plurality of conveyance rollers.

7. The aircraft cargo handling system of claim 1, wherein the first cargo handling robot and second cargo handling robot communicate via a network.

8. The aircraft cargo handling system of claim 7, further comprising the control module in communication with the network and configured to provide instructions to the first cargo handling robot and the second cargo handling robot.

9. The aircraft cargo handling system of claim 1, wherein the sensing module comprises one of a camera, a structured light sensor, a light detection and ranging sensor, an infrared sensor, a depth sensor, a 3D scanner, an ultrasound range finder, or a radar sensor.

10. A cargo handling robot, comprising:
a sensing agent comprising a sensing module, a computing module, and a communication module;
an attachment mechanism; and
a movement mechanism, wherein the attachment mechanism is configured to couple to a cargo unit and the movement mechanism is configured to transport the cargo unit from a first position to a second position along two different dimensions in response to receiving instructions from a control module;
wherein the cargo handling robot is configured to communicate with a second cargo handling robot so as to simultaneously move the cargo unit together with the second cargo handling robot; and
the first cargo handling robot and the second cargo handling robot are capable of functioning autonomously.

11. The cargo handling robot of claim 10, wherein the movement mechanism and attachment mechanisms are powered by an internal battery or by an external power source.

12. The cargo handling robot of claim 10, wherein the movement mechanism comprises a motor coupled to a gear box configured to drive a set of high friction coefficient wheels.

13. The cargo handling robot of claim 10, wherein the sensing module comprises one of a camera, a structured light sensor, a light detection and ranging sensor, an infrared sensor, a depth sensor, a 3D scanner, an ultrasound range finder, or a radar sensor.

14. A method of moving a cargo unit via multiple cargo handling robots, the method comprising:
transmitting, via a network, a first position to a first cargo handling robot and a second cargo handling robot;
moving the first cargo handling robot and the second cargo handling robot to the first position;
attaching the first cargo handling robot and the second cargo handling robot to the cargo unit at the first position;
transmitting, via the network, a second position to the first cargo handling robot and the second cargo handling robot; and
moving, via the first cargo handling robot and the second cargo handling robot, the cargo unit to the second position, wherein the first cargo handling robot and the second cargo handling robot transport the cargo unit horizontally about a cargo deck in response to moving from the first position to the second position;
wherein the first cargo handling robot and the second cargo handling robot comprise a sensing agent comprising a sensing module, a computing module, and a communication module; and
the first cargo handling robot and the second cargo handling robot are capable of functioning autonomously.

15. The method of claim 14, wherein attaching the first cargo handling robot and the second cargo handling robot to the cargo unit comprises utilizing attachment mechanisms of the first cargo handling robot and the second cargo handling robot, the attachment mechanisms comprising one of an active attachment mechanism or a passive attachment mechanism.

16. The method of claim 14, wherein moving the cargo unit to the second position comprises moving the cargo unit in two dimensions.

17. The method of claim 14, wherein the network is in communication with a control module configured to provide instructions to the first cargo handling robot and the second cargo handling robot.

18. The method of claim 14, wherein the step of moving, via the first cargo handling robot and the second cargo handling robot, the cargo unit to the second position includes simultaneously moving the first cargo handling robot and the second cargo handling robot from the first position to the second position while each are engaged with the cargo unit, to transport the cargo unit from the first position to the second position.

\* \* \* \* \*